United States Patent
Lee et al.

(10) Patent No.: US 10,699,160 B2
(45) Date of Patent: Jun. 30, 2020

(54) NEURAL NETWORK METHOD AND APPARATUS

(71) Applicants: Samsung Electronics Co., Ltd., Suwon-si (KR); Korea Advanced Institute of Science and Technology, Daejeon (KR)

(72) Inventors: Sehwan Lee, Suwon-si (KR); Leesup Kim, Daejeon (KR); Hyeonuk Kim, Gyeongsan-si (KR); Jaehyeong Sim, Gunsan-si (KR); Yeongjae Choi, Changwon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 126 days.

(21) Appl. No.: 16/110,664

(22) Filed: Aug. 23, 2018

(65) Prior Publication Data

US 2019/0065896 A1    Feb. 28, 2019

Related U.S. Application Data

(60) Provisional application No. 62/549,084, filed on Aug. 23, 2017.

(30) Foreign Application Priority Data

Oct. 18, 2017    (KR) ........................ 10-2017-0135246

(51) Int. Cl.
*G06K 9/62* (2006.01)
*G06N 3/04* (2006.01)
*G06N 3/063* (2006.01)

(52) U.S. Cl.
CPC ........... *G06K 9/623* (2013.01); *G06K 9/6251* (2013.01); *G06K 9/6267* (2013.01); *G06N 3/04* (2013.01); *G06N 3/0454* (2013.01); *G06N 3/063* (2013.01)

(58) Field of Classification Search
CPC .... G06K 9/623; G06K 9/6251; G06K 9/6267; G06N 3/04; G06N 3/0454
See application file for complete search history.

(56) References Cited

U.S. PATENT DOCUMENTS 4,750,144 A * 6/1988 Wilcox ................ G06F 7/5443
382/279
9,582,726 B2    2/2017 Pan et al.
(Continued)

FOREIGN PATENT DOCUMENTS

CN        106682736 A        5/2017

OTHER PUBLICATIONS

H. Kim, et al., "A Kernel Decomposition Architecture for Binary-weight Convolutional Neural Networks," *Proceedings of the 54th Annual Design Automation Conference*, Article No. 60, Austin, Texas, Jun. 2017 (6 pages, in English).

*Primary Examiner* — David Bilodeau
(74) *Attorney, Agent, or Firm* — NSIP Law

(57) ABSTRACT

A processor-implemented neural network method includes: obtaining, from a memory, data an input feature map and kernels having a binary-weight, wherein the kernels are to be processed in a layer of a neural network; decomposing each of the kernels into a first type sub-kernel reconstructed with weights of a same sign, and a second type sub-kernel for correcting a difference between a respective kernel, among the kernels, and the first type sub-kernel; performing a convolution operation by using the input feature map and the first type sub-kernels and the second type sub-kernels (Continued)

decomposed from each of the kernels; and obtaining an output feature map by combining results of the convolution operation.

20 Claims, 14 Drawing Sheets

(56) References Cited

U.S. PATENT DOCUMENTS

| | | |
|---|---|---|
| 2016/0358321 A1* | 12/2016 | Xu ........................ G06T 7/0002 |
| 2017/0102921 A1 | 4/2017 | Henry et al. |
| 2017/0103318 A1 | 4/2017 | Ross et al. |
| 2017/0200078 A1 | 7/2017 | Bichler |
| 2018/0181858 A1* | 6/2018 | Son ....................... G06N 3/0454 |
| 2019/0042923 A1* | 2/2019 | Janedula .................. G06N 3/04 |
| 2019/0370641 A1* | 12/2019 | Fukui ..................... G06N 3/084 |

\* cited by examiner

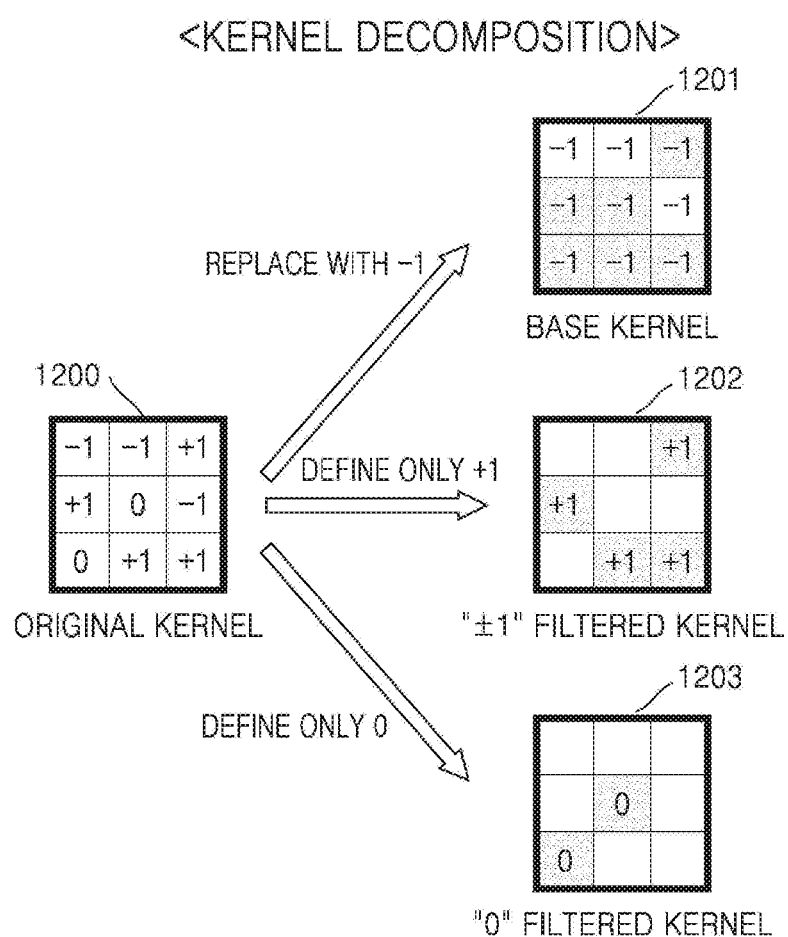

NEURAL NETWORK METHOD AND APPARATUS

CROSS-REFERENCE TO RELATED APPLICATIONS

This application claims the benefit under 35 U.S.C. § 119(a) of U.S. Provisional Application No. 62/549,084, filed on Aug. 23, 2017, in the U.S. patent and Trademark Office, and Korean Patent Application No. 10-2017-0135246, filed on Oct. 18, 2017, in the Korean Intellectual Property Office, the entire disclosures of which are incorporated herein by reference for all purposes.

BACKGROUND

1. Field

The following description relates to a neural network method and apparatus, and more particularly to a neural network method and apparatus for performing convolution operations between a feature map and a kernel in a neural network.

2. Description of the Related Art

According to recent development of neural network technology, studies of analyzing input data by using a neural network in various types of electronic systems and extracting valid information are being actively conducted. An apparatus processing a neural network requires a large amount of operations with respect to complicated input data. Accordingly, technology to efficiently process operations related to a neural network is required so as to analyze a large amount of input data in real time by using a neural network and extract desired information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: obtaining, from a memory, data of an input feature map and kernels having a binary-weight, wherein the kernels are to be processed in a layer of a neural network; decomposing each of the kernels into a first type sub-kernel reconstructed with weights of a same sign, and a second type sub-kernel for correcting a difference between a respective kernel, among the kernels, and the first type sub-kernel; performing a convolution operation by using the input feature map and the first type sub-kernels and the second type sub-kernels decomposed from each of the kernels; and obtaining an output feature map by combining results of the convolution operation.

The first type sub-kernel may be reconstructed by replacing weights of all elements of each of the kernels with a same value.

When the input feature map has an index of an odd channel, the first type sub-kernel may be a sub-kernel reconstructed by setting weights of all elements of the first type sub-kernel with a same value of a first sign. When the input feature map has an index of an even channel, the first type sub-kernel may be a sub-kernel reconstructed by replacing the weights of all elements of the first type sub-kernel with a same value of a second sign.

The first type sub-kernels, respectively decomposed from the kernels for performing the convolution operation with the input feature map may be identical.

The second type sub-kernel may be a sub-kernel reconstructed by defining selected elements of the second type sub-kernel with corresponding original weights of the respective kernel that are different from corresponding weights among the weights of the first type sub-kernel, and not defining remaining elements of the second type sub-kernel with any weights.

The performing of the convolution operation may include performing a first convolution operation between a current window of the input feature map and the first type sub-kernel decomposed from an initial kernel among the kernels, and performing a second convolution operation between the current window and each of the second type sub-kernels decomposed from the kernels.

In the performing of the convolution operation, the first convolution operation between the current window and each of the first type sub-kernels decomposed from remaining kernels among the kernels, excluding the initial kernel, is clock-gated to be skipped, and a result of the first convolution operation performed with respect to the initial kernel may be reused as results of the first convolution operation with respect to the remaining kernels.

The second convolution operation may be performed between matrix elements for which a weight is defined in each of the second type sub-kernels and a corresponding pixel of the input feature map, and may be skipped with respect to matrix elements in each of the second type sub-kernels for which a weight is not defined.

The obtaining of the output feature map may include obtaining the output feature map by determining each pixel value among pixel values of the output feature map, based on a value obtained by adding double a result value of a second convolution operation between the second type sub-kernel and a window of the input feature map to a result value of a first convolution operation between the first type sub-kernel and the window.

In another general aspect, a non-transitory computer-readable recording medium stores instructions that, when executed by a processor, cause the processor to perform the method described above.

In another general aspect, a neural network apparatus includes: a processor configured to obtain data of an input feature map and kernels having a binary-weight, wherein the kernels are to be processed in a layer of the neural network, decompose each of the kernels into a first type sub-kernel reconstructed with weights of a same sign, and a second type sub-kernel for correcting a difference between a respective kernel, among the kernels, and the first type sub-kernel, perform a convolution operation by using the input feature map and the first type sub-kernels and the second type sub-kernels decomposed from each of the kernels, and obtain an output feature map by combining results of the convolution operation.

The first type sub-kernel may be reconstructed by replacing weights of all elements of each of the kernels with a same value.

When the input feature map has an index of an odd channel, the first type sub-kernel may be a sub-kernel reconstructed by replacing weights of all elements of the first type sub-kernel with a same value of a first sign. When the input feature map has an index of an even channel, the first type sub-kernel may be a sub-kernel reconstructed by replacing the weights of all elements of the first type sub-kernel with a same value of a second sign.

The first type sub-kernels respectively decomposed from the kernels for performing the convolution operation with the input feature map may be identical.

The second type sub-kernel may be a sub-kernel reconstructed by defining selected elements of the second type sub-kernel with corresponding original weights of the respective kernel that are different from corresponding weights among the weights of the first type sub-kernel, and not defining remaining elements of the second type sub-kernel with any weights.

For the performing of the convolution, the processor may be configured to perform a first convolution operation between a current window of the input feature map and the first type sub-kernel decomposed from an initial kernel among the kernels, and perform a second convolution operation between the current window and each of the second type sub-kernels decomposed from the kernels.

The processor may be further configured to clock-gate a first convolution operation between the current window and each of the first type sub-kernels decomposed from remaining kernels among the kernels, excluding the initial kernel, to be skipped, and reuse a result of the first convolution operation performed with respect to the initial kernel as results of the first convolution operation with respect to the remaining kernels.

The second convolution operation may be performed between matrix elements for which a weight is defined in each of the second type sub-kernels and a corresponding pixel of the input feature map, and may be skipped with respect to matrix elements in each of the second type sub-kernels for which a weight is not defined.

The processor may be further configured to obtain the output feature map by determining each pixel value among pixel values of the output feature map, based on a value obtained by adding double a result value of a second convolution operation between the second type sub-kernel and a window of the input feature map to a result value of a first convolution operation between the first type sub-kernel and the window.

The neural network apparatus may further include a memory storing instructions that, when executed, configure the processor to obtain the data and the kernels, decompose each of the kernels, perform the convolution operation, and obtain the output feature map.

Other features and aspects will be apparent from the following detailed description, the drawings, and the claims.

BRIEF DESCRIPTION OF THE DRAWINGS

FIGS. 12A and 12B are diagrams illustrating kernel decomposition of a ternary-weight kernel, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
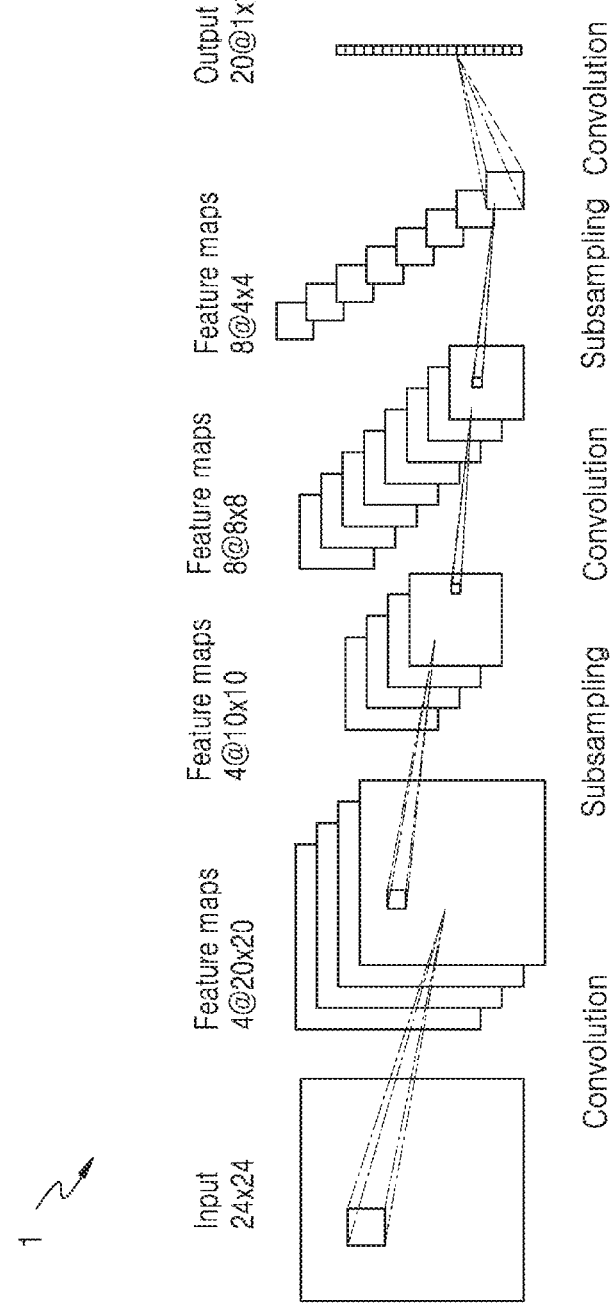
FIG. 1 is a diagram illustrating architecture of a neural network, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram for describing architecture of a neural network 1, according to an embodiment.

Referring to FIG. 1, the neural network 1 may be architecture of a deep neural network (DNN) or an n-layer neural network. The DNN or n-layer neural network may correspond to a convolutional neural network (CNN), a recurrent neural network (RNN), a deep belief network, a fully connected network, a bi-directional neural network, or a restricted Boltzman machine, or may include different or overlapping neural network portions respectively with full, convolutional, recurrent, and/or bi-directional connections. For example, the neural network 1 may be embodied as a CNN, but is not limited thereto. In FIG. 1, some convolution layers of a CNN corresponding to an example of the neural network 1 are illustrated, but the CNN may further include, in addition to the illustrated convolution layers, a pooling layer or a fully connected layer. The use of the term 'may' herein with respect to an example or embodiment, e.g., as to what an example or embodiment may include or implement, means that at least one example or embodiment exists where such a feature is included or implemented while all examples and embodiments are not limited thereto.

The neural network 1 may be embodied as architecture having a plurality of layers including an input image, feature maps, and an output. In the neural network 1, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 1. In other words, the recognition result is output as a final result.

Alternatively, the neural network 1 may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network 1.

For example, when an input image having a 24×24 pixel size is input to the neural network 1 of FIG. 1, the input image may be output as feature maps of four channels each having a 20×20 size, through a convolution operation with a kernel. Then, sizes of the 20×20 feature maps may be reduced through the repeated convolution operations with the additional kernels, and finally, features each having a 1×1 size may be output. In the neural network 1, a convolution operation and a sub-sampling (or pooling) operation may be repeatedly performed in several layers so as to filter and output robust features, which may represent the entire input image, from the input image, and derive the recognition result of the input image through final features that are output.

Figure 2:
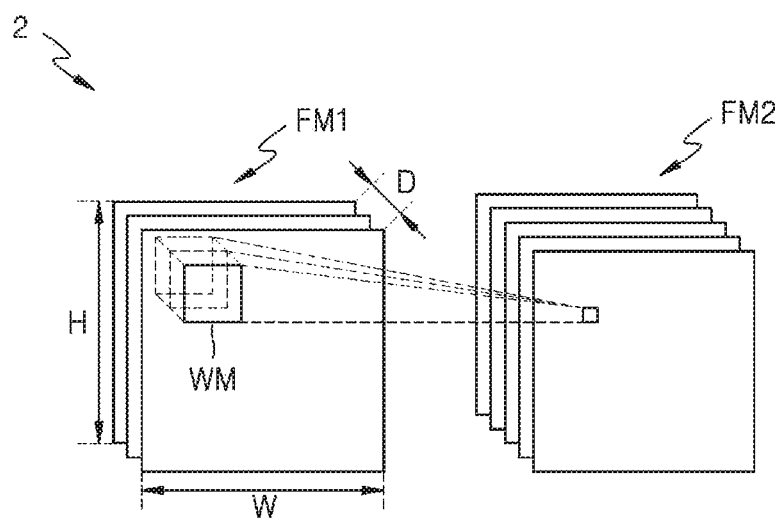
FIG. 2 is a diagram illustrating a relationship between an input feature map and an output feature map in a neural network, according to an embodiment.

FIG. 2 is a diagram for describing a relationship between an input feature map and an output feature map in a neural network, according to an embodiment.

Referring to FIG. 2, in one layer 2 of the neural network 1, a first feature map FM1 may correspond to the input feature map or a feature map result of a previous layer, and a second feature amp FM2 may correspond to the output feature map. A feature map may be a data set in which various features of input data are expressed. The first and second feature maps FM1 and FM2 may have elements of a two-dimensional (2D) matrix or a three-dimensional (3D) matrix, and, as a non-limiting example, a pixel value may be defined in each element. The first and second feature maps FM1 and FM2 may each have a respective width W (also referred to as a number of columns), a respective height H (also referred to as a number of rows), and a respective depth D. In this example, the depth D may correspond to the number of channels, such as shown with respect to the first feature map FM1.

A convolution operation may be performed with respect to the first feature map and a weight map WM of a kernel, and as a result, a channel of the second feature map FM2 may be generated. The weight map WM filters features of the first feature map FM1 by performing a convolution operation on the first feature map FM1 by using respective weights defined in each element of the kernel. The convolution operation is performed with windows (also referred to as tiles) of the first feature map FM1 while shifting the weight map WM over the first feature map FM1 in a sliding window manner. In each shift, each of weights included in the weight map WM may be multiplied and added to pixel values of the overlapping windows in the first feature map FM1. As the first feature map FM1 and the weight map WM are convolved, one channel of the second feature map FM2 may be generated. In FIG. 2, the weight map WM with respect to one kernel is illustrated, but in reality, weight maps of a plurality of kernels may each be convolved with the first feature map FM1, and thus the second feature map FM2 of a plurality of channels may be generated.

Meanwhile, the second feature map FM2 may then correspond to or be used as an input feature map of a next layer. For example, the second feature map FM2 may be an input feature map of a pooling (or subsampling) layer.

In FIGS. 1 and 2, only a schematic architecture of the neural network 1 is illustrated for convenience of description. However, the neural network 1 may include greater or fewer numbers of layers, feature maps, and kernels than illustrated in FIGS. 1 and 2, and may have various sizes in various examples.

Figure 3:
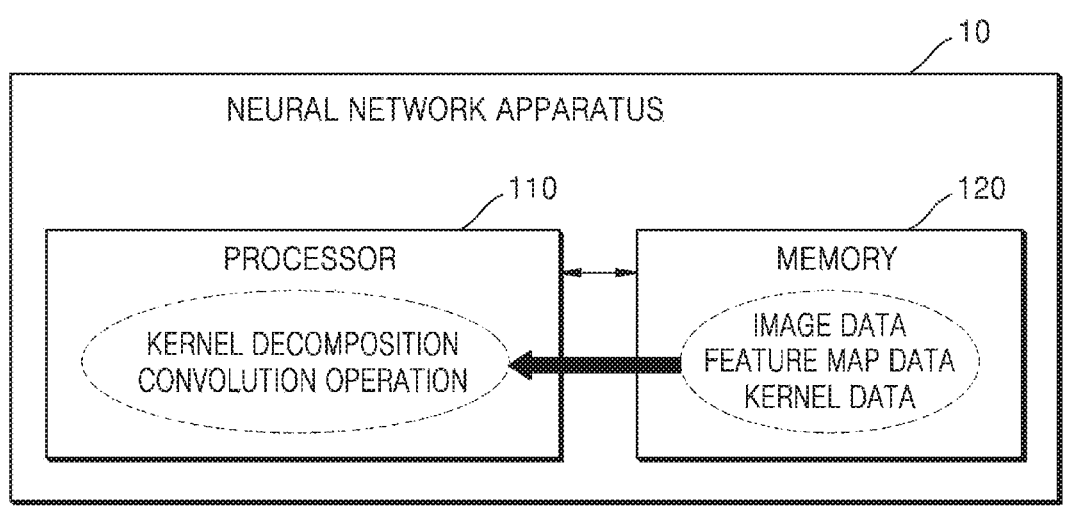
FIG. 3 is a block diagram of a hardware configuration of a neural network apparatus, according to an embodiment.

FIG. 3 is a block diagram of a hardware configuration of a neural network apparatus 10, according to an embodiment.

The neural network apparatus 10 may be any one of various types of devices, such as a personal computer (PC), a server device, a mobile device, and an embedded device, and for example, may correspond to a smartphone, a tablet device, an augmented reality (AR) device, an Internet of Things (IoT) device, an autonomous vehicle, a robotic device, or a medical device, which performs voice recognition, image recognition, and image classification using a neural network. However, the neural network apparatus 10 is not limited to the foregoing examples. Alternatively, the neural network apparatus 10 may correspond to an exclusive hardware (HW) accelerator mounted on such a device, and may be an HW accelerator, such as a neural processing unit (NPU), a tensor processing unit (TPU), or a neural engine, which is an exclusive hardware module for driving a neural network, but is not limited thereto.

According to an example, the neural network apparatus 10 may be configured to process image data in an input image to the neural network apparatus 10 to extract information about the input image for image recognition, image verification, or image classification. For example, the neural network apparatus 10 performs convolution with respect to image data, or one or more input feature maps corresponding to the input image, to generate an output feature map. The neural network apparatus 10 generates an image recognition output, an image verification indication, or an image classification output based on information in the output feature map. That is, the neural network apparatus 10 may indicate the result of the image recognition, verification or classification, either explicitly or implicitly. For example, the recognized, verified, or classified image may be explicitly indicated through display in text form on a display of the neural network apparatus 10 or audibly fed back to the user or another user, or implicit indications may be provided through additional operations, or selective non-operations, of the neural network apparatus 10 based on the result of the image recognition, verification, or classification.

According to another example, the neural network apparatus 10 may be configured to process audio data in voice entry to the neural network apparatus 10 to extract information about the voice entry for speech recognition or speech-to-text translation of the voice entry. For example, the neural network apparatus 10 performs convolution with respect to one or more input feature maps corresponding to the voice entry to generate an output feature map. The neural network apparatus 10 generates a voice recognition output or a text translation output based on information in the output feature map. That is, the neural network apparatus 10 may indicate the result of the speech recognition or speech-to-text translation, either explicitly or implicitly. For example, the recognized speech may be explicitly indicated through display in text form on a display of the neural network apparatus 10 or audibly fed back to the user or another user, or implicit indications may be provided through additional operations, or selective non-operations, of the neural network apparatus 10 based on the result of the speech recognition. For example, the neural network apparatus 10 may further perform a translation operation based on the recognition result, unlock the neural network apparatus 10 when the neural network apparatus 10 is a mobile device, or perform other operations of such an electronic device example.

In comparison with conventional neural network apparatuses, in the neural network apparatus 10, the number of operations required for convolution and the computational complexity of the neural network executed by the neural network apparatus 10 are substantially reduced, thereby providing improved computer functionality.

Referring to FIG. 3, the neural network apparatus 10 includes a processor 110, e.g., one or more processors 110, and a memory 120, e.g., one or more memories 120. One of ordinary skill in the art would understand that the neural network apparatus 10 may include components other than those shown in FIG. 3, in various examples.

The processor 110 controls overall functions for executing the neural network apparatus 10. For example, the processor 110 may control the neural network apparatus 10 by executing programs or applications stored in the memory 120 of the neural network apparatus 10. The processor 110 may be embodied as a central processing unit (CPU), a graphical processing unit (GPU), or an application processor (AP) included in the neural network apparatus 10, but is not limited thereto.

The memory 120 is hardware storing various types of data processed in the neural network apparatus 10, and for example, the memory 120 may store data processed or to be processed by the neural network apparatus 10. Also, the memory 120 may store applications or drivers to be driven by the neural network apparatus 10. The memory 120 may include random-access memory (RAM), such as dynamic random-access memory (DRAM) or static random-access memory (SRAM), read-only memory (RAM), electrically erasable programmable read-only memory (EEPROM), CD-ROM, Blu-ray, optical disk storage, a hard disk drive (HDD), solid state drive (SSD), or a flash memory.

The processor 110 reads or writes neural network data, for example, image data, feature map data, or kernel data, from or to the memory 120, and executes a neural network by using the read/written neural network data. When the neural network is executed, the processor 110 generates data related to an output feature map by repeatedly performing a convolution operation between an input feature map and one or more kernels. Here, an operation count of the convolution operation may be determined based on various factors, such as the number of channels of the input feature map, the number of channels of the kernel(s), the size of the input feature map, the size of the kernel(s), and precision of a value. Compared to the neural network 1 of FIG. 1, a neural network driven in the neural network apparatus 10 may be embodied in more complicated architecture, in various examples. Typically, a processor would need to perform convolution operations of a very large operation count up to hundreds of millions to tens of billions, and a frequency of the processor accessing a corresponding memory for the convolution operations would also be remarkably increased. Due to a load of such an operation count, the typical neural network may not be smoothly processed or may not be capable of being processed in an embedded device or a mobile device, such as a smartphone, a tablet device, or a wearable device, which has a relatively low processing performance.

A kernel in the neural network 1 may have a floating-point-type weight or a fixed-point-type weight, or may correspond to a binary-weight kernel or a ternary-weight kernel. In other words, the kernel in the neural network may be defined in various ways while considering various factors, such as a purpose of the neural network 1 and performance of a device in differing examples. Herein, a binary-weight kernel may be a kernel in which a weight value is constrained to, for example, +1 or −1, unlike a kernel having a floating-point weight or a fixed-point weight. Also, a ternary-weight kernel may denote a kernel in which a weight value is constrained to +1, 0, or −1.

Hereinafter, it is described that the neural network executed by the processor 110 performs a convolution operation by using a kernel in which a weight is quantized to a certain level, such as a binary-weight kernel or a ternary-weight kernel, but the disclosure is not limited to such an example, and any other type of kernel may be used.

Even when a kernel is a binary-weight kernel or a ternary-weight kernel in which a weight is quantized to a certain level, a proportion of convolution operations in an overall operation count with respect to processing of the neural network may still be high. Accordingly, the neural network 1 may be processed such that the operation count of the convolution operation is sufficiently reduced while any accuracy loss due to such convolution count reductions is reduced.

In a binary-weight kernel, a weight is constrained to 2 values, for example, −1 or +1, 0 or 1, or −1 or 0), and thus when two weights are arbitrarily selected in the binary-weight kernel, it is highly likely that the selected weights are the same. In other words, compared to a floating-point-type or fixed-point-type kernel, two arbitrary binary-weight kernels in a layer of a neural network are highly likely to be similar. By using such a probability of similarity, when a convolution operation is performed by decomposing kernels of the neural network into an approximate sub-kernel common to the kernels and a sub-kernel that corrects an error, an operation count of a convolution operation may be efficiently reduced. In one or more following embodiments, methods of performing a convolution operation by decomposing kernels of a neural network as such will be described. The methods described hereinafter may be performed by the processor 110 and the memory 120 of the neural network apparatus 10, though examples are not limited thereto.

Figure 4:
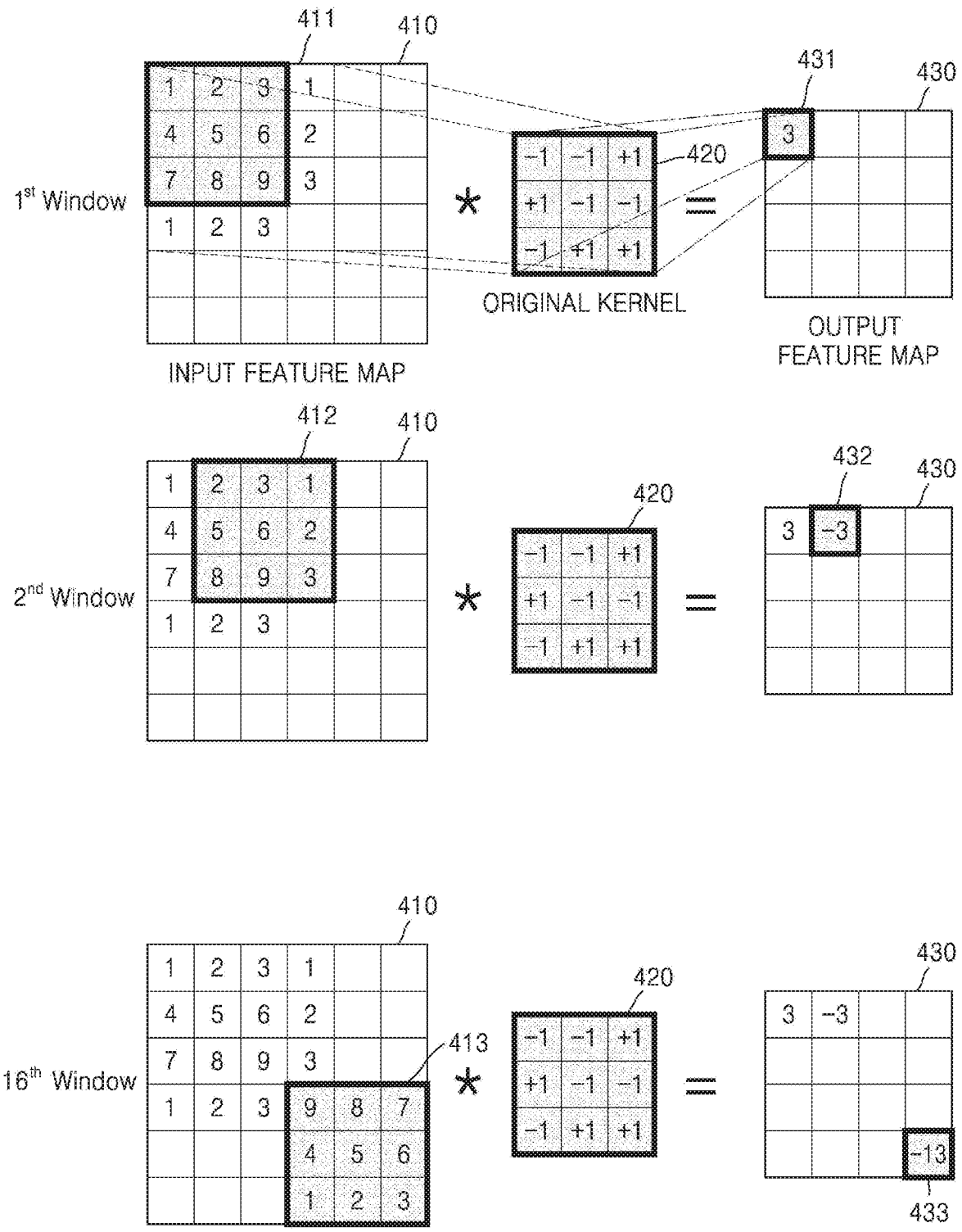
FIG. 4 is a diagram illustrating a convolution operation in a neural network.

FIG. 4 is a diagram for describing a convolution operation in a neural network.

In FIG. 4, a size of an input feature map 410 is 6×6, a size of an original kernel 420 is 3×3, and a size of an output feature map 430 is 4×4. However, the sizes are not limited to these examples, and the neural network may include various sizes of feature maps and kernels. Also, values defined in the input feature map 410, the original kernel 420, and the output feature map 430 are only examples, and the disclosure is not limited to the disclosed values. The original kernel 420 corresponds to a binary-weight kernel described above.

The original kernel 420 performs a convolution operation while sliding across the input feature map 410 in a window unit having a size of 3×3. The convolution operation is an operation in which each pixel value of the output feature map 430 is obtained by adding all values obtained by multiplying each pixel value of any window of the input feature map 410 and a weight of each element at a corresponding location in the original kernel 420. In detail, the original kernel 420 may first perform a convolution operation with a first window 411 of the input feature map 410. In other words, pixel values of 1, 2, 3, 4, 5, 6, 7, 8, and 9 of the first window 411 are respectively multiplied by weights −1, −1, +1, +1, −1, −1, −1, +1, and +1 of an element of the original kernel 420, and as a result, values of −1, −2, 3, 4, −5, −6, −7, 8, and 9 are obtained. Then, the values of −1, −2, 3, 4, −5, −6, −7, 8, and 9 are added to obtain a value of 3, and accordingly, a pixel value 431 of a first row and a first column of the output feature map 430 is determined to be the value of 3. In this example, the pixel value 431 of the first row and the first column of the output feature map 430 corresponds to the first window 411. Similarly, a convolution operation is performed between a second window 412 of the input feature map 410 and the original kernel 420, and thus a pixel value 432 of the first row and a second column of the output feature map 430 is determined to be −3. Finally, a convolution operation is performed between a sixteenth window 413, i.e., a last window of the input feature map 410, and the original kernel 420, and thus a pixel value 433 of a fourth row and a fourth column of the output feature map 430 is determined to be −13.

In other words, a convolution operation between one input feature map 410 and one original kernel 420 may be processed by repeatedly performing multiplication of values of elements of the input feature map 410 and values of elements of the original kernel 420, which correspond to each other, and addition of multiplication results, and the output feature map 430 is generated as a result of the convolution operation.

However, in the convolution operation between any window of the input feature map 410 and the original kernel 420, multiplication and addition of the multiplication results are performed in accordance with the number of elements, and thus an operation count may be high when the number of elements is high. In addition, when the number of times sliding is performed in an input feature map is high, when input feature maps of many channels exist in a neural network, or when many layers exist, an operation count increases exponentially. In the convolution operations according to one or more embodiments, an operation count may be reduced by decomposing the original kernel 420 into several sub-kernels.

Figure 5:
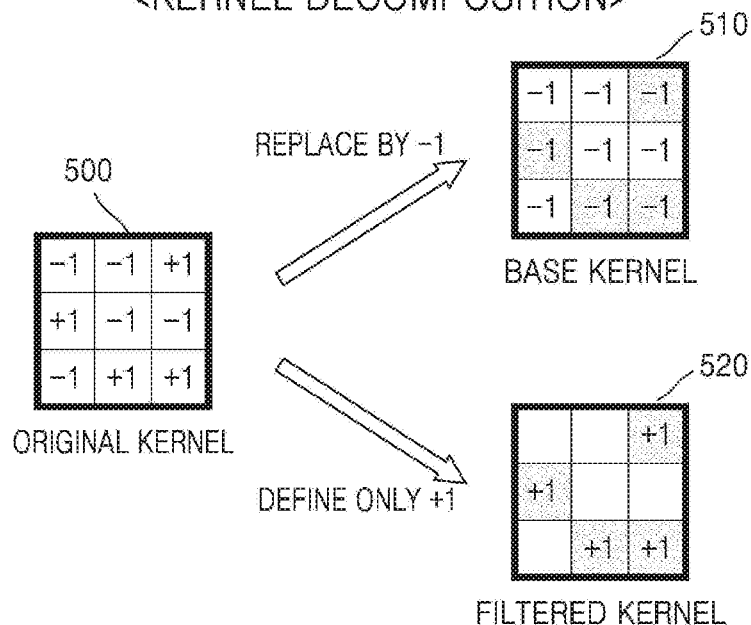
FIG. 5 is a diagram illustrating kernel decomposition, according to an embodiment.

FIG. 5 is a diagram for describing kernel decomposition according to an embodiment.

Referring to FIG. 5, an original kernel 500 is a binary-weight kernel, and has a weight of −1 or +1. A value of binary-weight is −1 or +1 in the current embodiment, but the value is not limited thereto, and a binary-weight may be +1 or 0, or −1 or 0.

The original kernel 500 may be decomposed into a base kernel 510 and a filtered kernel 520.

In this example, the base kernel 510 may be a sub-kernel in which the original kernel 500 is reconstructed with weights of a same sign, and may also be referred to as a first type sub-kernel. In FIG. 5, weights of all elements of the original kernel 500 are replaced by the same −1.

In this example, the filtered kernel 520 may be defined as a sub-kernel in which an original weight of the original kernel 500 is defined by elements of the original kernel 500 having a different weight from the base kernel 510 and weights are not defined for the remaining elements of the original kernel 500. The filtered kernel 520 may also be referred to as a second type of sub-kernel. In FIG. 5, elements which are different between the original kernel 500 and the base kernel 510 are elements having a weight of +1 in the original kernel 500. Accordingly, as shown in FIG. 5, the filtered kernel 520 is a sub-kernel in which +1 is defined in only some elements thereof.

As such, the original kernel 500 having a binary-weight may be decomposed into the base kernel 510 in which all of its elements are replaced by weights of −1, and the filtered kernel 520 in which weights of +1 are defined in only some of its elements.

Figure 6:
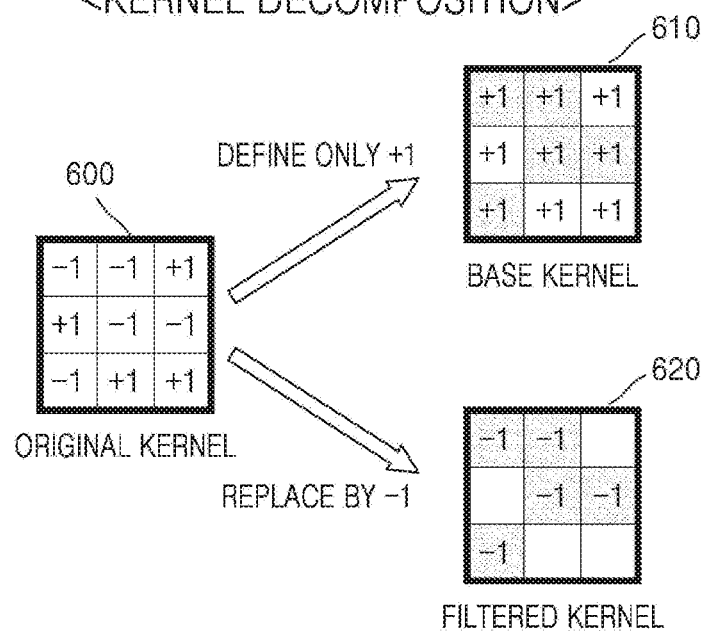
FIG. 6 is a diagram illustrating kernel decomposition, according to an embodiment.

FIG. 6 is a diagram for describing kernel decomposition according to another embodiment.

Referring to FIG. 6, an original kernel 600 may be decomposed in a similar manner to the original kernel 500 of FIG. 5. However, unlike FIG. 5, the original kernel 600 may be decomposed into a base kernel 610 in which all of its elements are replaced by weights of +1, and a filtered kernel 620 in which weights of −1 are defined in only some of its elements.

In other words, a binary-weight kernel of a neural network according to an example may be decomposed by using kernel decomposition described with reference to FIG. 5 or 6.

The values defined in the original kernels 500 and 600 are only examples, and the disclosure is not limited thereto.

Figure 7:
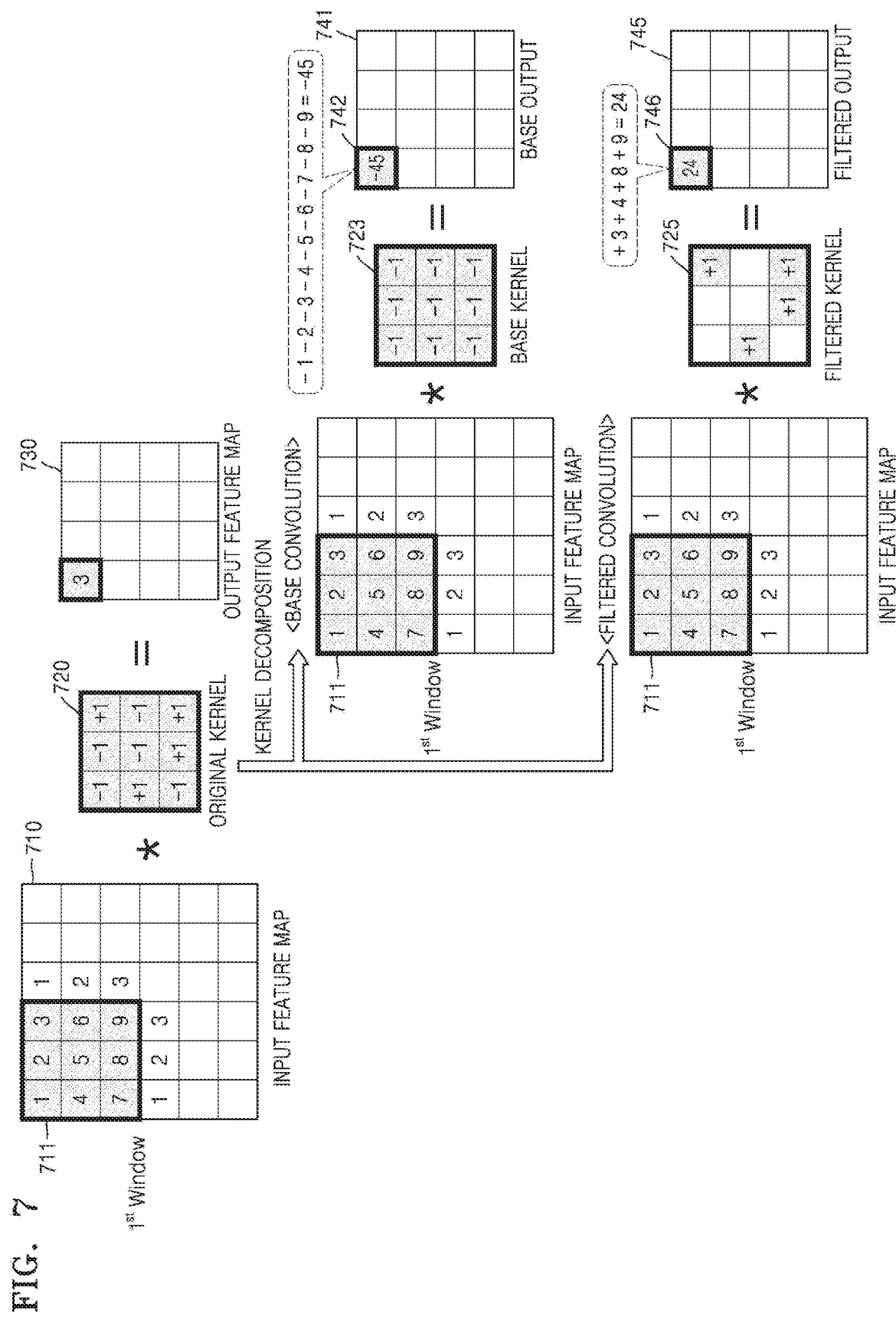
FIG. 7 is a diagram illustrating a convolution operation between an input feature map and sub-kernels decomposed from an original kernel, according to an embodiment.

FIG. 7 is a diagram for describing a convolution operation between an input feature map 710 and sub-kernels decomposed from an original kernel 720, according to an embodiment.

Referring to FIG. 7, unlike the convolution operation described above with reference to FIG. 4, the input feature map 710 performs a convolution operation on each of a base kernel 723 and a filtered kernel 725, which are decomposed from the original kernel 720, instead of the original kernel 720.

First, a first window 711 of the input feature map 710 performs a base convolution operation (first convolution operation) with the base kernel 723 and a filtered convolution operation (second convolution operation) with the filtered kernel 725. A base convolution operation result 742 is −45 and a filtered convolution operation result 746 is 24. Then, the base convolution operation with the base kernel 723 and the filtered convolution operation with the filtered kernel 725 are performed on each of remaining windows of the input feature map 710, and accordingly, entire pixel values of a base output 741 and filtered output 745 may be determined. The filtered convolution operation may be performed by only using an element in which a weight is defined in the filtered kernel 725, and multiplication with respect to an element in which a weight is not defined may be skipped. Accordingly, a multiplication operation count of the processor 110 may be decreased over previous typical approaches.

Pixels of the base output 741 and the filtered output 745 respectively correspond to pixels of an output feature map 730. Pixel values of the output feature map 730 may be determined by using corresponding pixel values of the base output 741 and the filtered output 745, as will be described with reference to FIG. 8. Herein, though pixels are referred to as corresponding to elements of a feature map, examples are not limited thereto.

Figure 8:
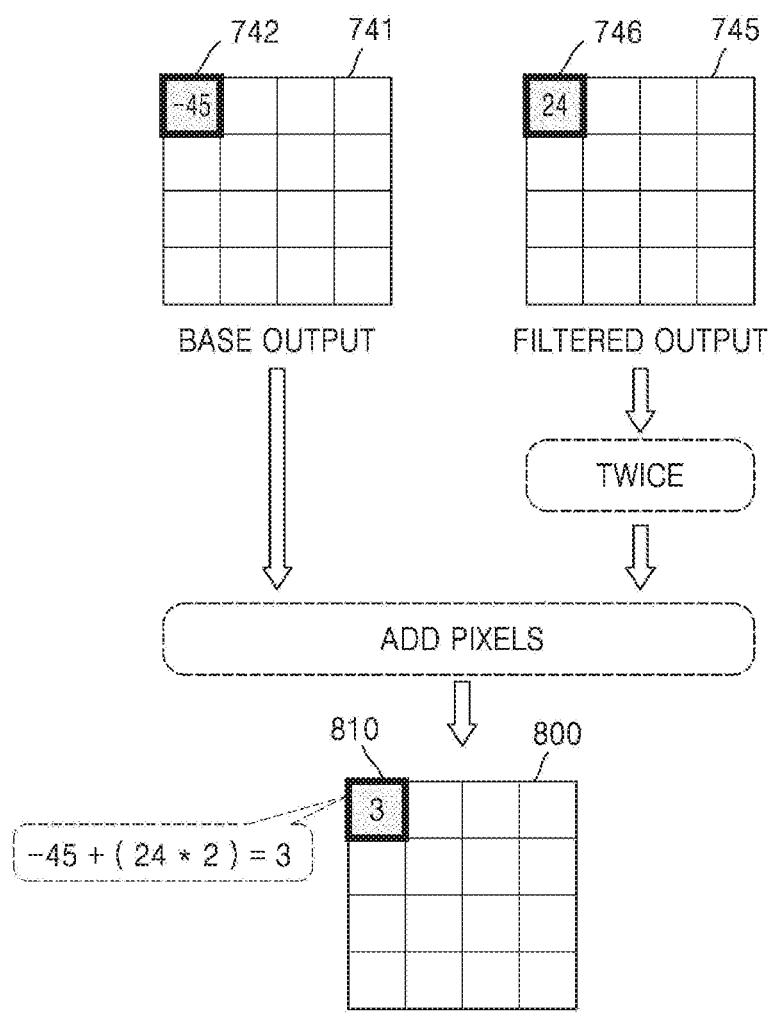
FIG. 8 is a diagram illustrating determination of a pixel value of an output feature map by using a base output and a filtered output, according to an embodiment.

FIG. 8 is a diagram for describing determination of a pixel value 810 of an output feature map 800 by using the base output 741 and the filtered output 745, according to an embodiment.

Referring to FIG. 8, the pixel value 810 of the output feature map 800 may be determined based on a value obtained by adding the base convolution operation result 742 of the base output 741 of FIG. 7 to double the filtered convolution operation result 746 of the filtered output 745. In other words, 3, i.e., a value obtained by adding −45, i.e., the base convolution operation result 742, to 48, i.e., double the filtered convolution operation result 746, is determined as the pixel value 810 of the output feature map 800. The base convolution operation result 742, the filtered convolution operation result 746, and the pixel value 810 are values at corresponding locations.

The pixel value 810 of the output feature map 800 finally obtained via kernel decomposition of the original kernel 720 of FIGS. 7 and 8 is the same as the pixel value 431 of the output feature map 430 obtained in FIG. 4 without kernel decomposition. However, an operation count of the convolution operation may be reduced in comparison to conventional convolution operations due to empty elements in the filtered kernel 725. In other words, when a convolution operation is performed by using kernel decomposition of the original kernel 720, the operation count of the convolution operation may be reduced while the same convolution operation result as the convolution operation without kernel decomposition is obtained.

The kernel decomposition described with reference to FIGS. 7 and 8 may be performed by using a method (a base kernel replaced by −1) described with reference to FIG. 5, but the disclosure is not limited to this example, and one of ordinary skill in the art would understand that the same result may be derived by kernel decomposition using a method (a base kernel replaced by +1) described with reference to FIG. 6, in another example. Also, values defined in the input feature map 710 and the original kernel 720 of FIGS. 7 and 8 are only examples, and the disclosure is not limited to these examples.

Although examples of using one first window 711 in the input feature map 710 and sub-kernels (the base kernel 723 and the filtered kernel 725) decomposed from one original kernel 720 are described in FIGS. 7 and 8, the processor 110 may perform convolution operations by suitably applying the above methods with respect to various input feature maps and various kernels in each layer of a neural network in examples.

Figure 9:
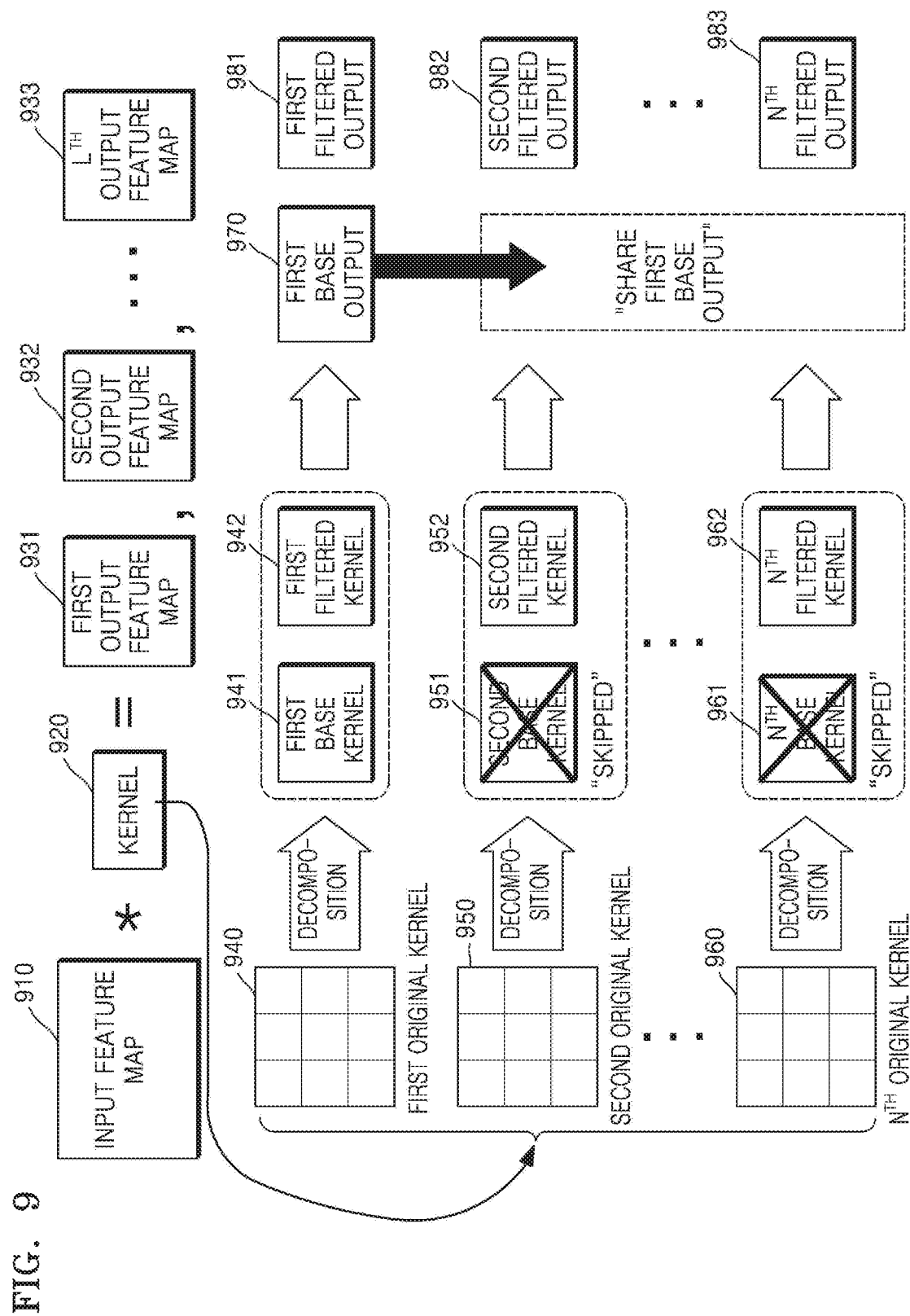
FIG. 9 is a diagram illustrating generation of output feature maps from one input feature map through a convolution operation, according to an embodiment.

FIG. 9 is a diagram for describing generation of a plurality of output feature maps, e.g., first through $L^{th}$ output feature maps 931 through 933, from one input feature map 910 through a convolution operation, according to an embodiment.

Referring to FIG. 9, the processor 110 generates the first through $L^{th}$ output feature maps 931 through 933 by performing a convolution operation between the input feature map 910 and each kernel of a plurality of kernels 920. For example, the first output feature map 931 may be generated by a convolution operation between the input feature map 910 and a first original kernel 940, the second output feature map 932 may be generated by the convolution operation between the input feature map 910 and a second original kernel 950, and the $L^{th}$ output feature map 933 may be generated by the convolution operation between the input feature map 910 and an $N^{th}$ original kernel 960, wherein N is a natural number.

The first original kernel 940 is a kernel used to perform the convolution operation with the input feature map 910. According to an example, the first original kernel 940 is decomposed into a first base kernel 941 and a first filtered kernel 942. A first base output 970 is obtained by a base convolution operation between the first base kernel 941 and each window of the input feature map 910, and a first filtered output 981 is obtained by a filtered convolution operation between the first filtered kernel 942 and each window of the input feature map 910. The first output feature map 931 is generated by combining the first base output 970 and the first filtered output 981 as described with reference to FIG. 8.

Then, the second original kernel 950 is also a kernel used to perform the convolution operation with the input feature map 910. The second original kernel 950 may also be decomposed into a second base kernel 951 and a second filtered kernel 952. In this example, the second base kernel 951 is the same as the first base kernel 941 obtained above because the first and second base kernels 941 and 951 are both sub-kernels in which elements of the first and second original kernels 940 and 950 are replaced by a weight (−1 or +1) of the same sign, respectively. For example, the elements of the first and second base kernels 941 and 951 may all be −1 or +1. Accordingly, results of the base convolution operation between the second base kernel 951 and each window of the input feature map 910 are the same as results of the base convolution operation between the first base kernel 941 and each window of the input feature map 910, i.e., the first base output 970. Thus, the base convolution operation between the second base kernel 951 and each window of the input feature map 910 may be skipped, and the first base output 970 is reused as the results of the base convolution operation between the second base kernel 951 and each window of the input feature map 910. In other words, the first base output 970 may be shared as results of a base convolution operation of other base kernels. Accordingly, when a convolution operation is performed between one input feature map and one base kernel, the processor 110 may skip a convolution operation with respect to remaining base kernels, and thus an operation count of the convolution operation may be reduced.

In FIG. 9, the first base kernel 941 is a sub-kernel for performing an initial base convolution operation for generating the first base output 970 to be shared as remaining base outputs, and thus in one or more examples, the first original kernel 940 where the first base kernel 941 originates from is referred to as an initial kernel. However, the first original kernel 940 may be referred to using any other term.

As described above, the remaining original kernel (the $N^{th}$ original kernel 960) is also decomposed into an $N^{th}$ base kernel 961 and an $N^{th}$ filtered kernel 962, but a base convolution operation between the input feature map 910 and the $N^{th}$ base kernel 961 is skipped and the first base output 970 may be shared as a result of the base convolution operation of the $N^{th}$ base kernel 961.

The filtered convolution operations between the input feature map 910 and the second through $N^{th}$ filtered kernels 952 through 962 are individually performed, and as a result, second filtered output 982 through $N^{th}$ filtered output 983 are obtained. The second through $L^{th}$ output feature maps 932 through 933 are generated by combining the first base output 970 and the second through $N^{th}$ filtered outputs 982 through 983, respectively.

As such, the processor 110 uses kernel decomposition while performing convolution operations on a plurality of kernels, thereby achieving an operation count reduction due to sharing of a base output, and an operation count reduction due to empty elements in a filtered kernel.

Figure 10:
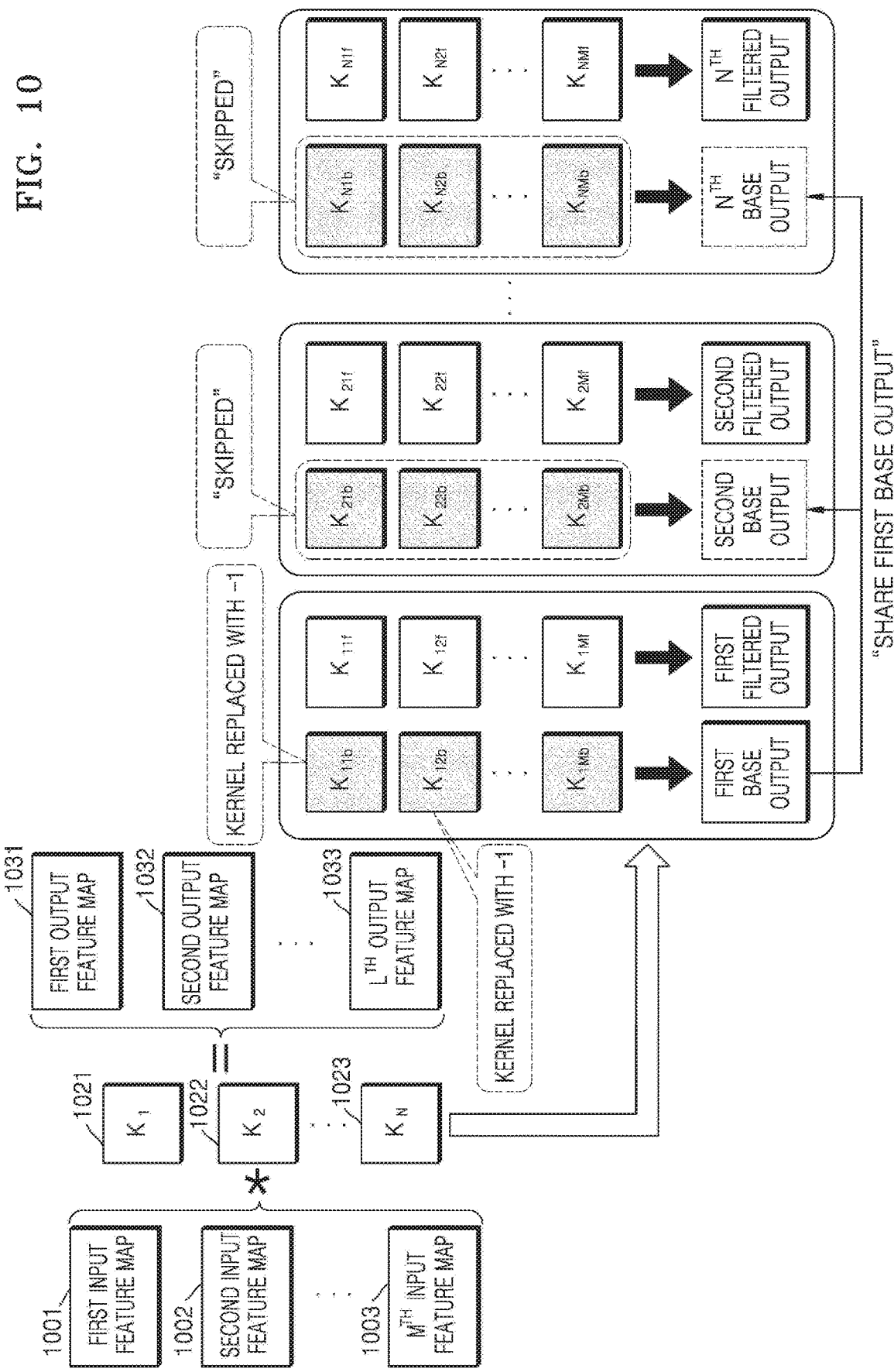
FIG. 10 is a diagram illustrating generation of output feature maps from input feature maps through a convolution operation, according to an embodiment.

FIG. 10 is a diagram for describing generation of a plurality of output feature maps, e.g., first through $L^{th}$ output feature maps 1031 through 1033 from a plurality of input feature maps, e.g., first through $M^{th}$ input feature maps 1001 through 1003, through a convolution operation, according to an embodiment.

Reference numeral $K_{NMb}$ of a sub-kernel in FIG. 10 is a base kernel decomposed from a $K_N^{th}$ original kernel 1023, and also a base kernel for a base convolution operation between the $M^{th}$ input feature map 1003 and the $K_N^{th}$ original kernel 1023. Also, reference numeral $K_{NMf}$ of the sub-kernel is a filtered kernel decomposed from the $K_N^{th}$ original kernel 1023, and also a filtered kernel for a filtered convolution operation between the $M^{th}$ input feature map 1003 and the $K_N^{th}$ original kernel 1023. For example, $K_{12b}$ indicates a base kernel decomposed from a $K_1^{th}$ original kernel 1021 and a base kernel for a base convolution operation between the second input feature map 1002 and the $K_1^{th}$ original kernel 1021. $K_{21f}$ indicates a filtered kernel decomposed from a $K_2^{th}$ original kernel 1022 and a filtered kernel for a filtered convolution operation between the first input feature map 1001 and the $K_2^{th}$ original kernel 1022, wherein M, N, and L are each a natural number.

The first input feature map 1001 may be an input feature map having an index of an odd channel in any layer of a neural network, and the second input feature map 1002 may be an input feature map having an index of an even channel in the layer.

Referring to FIG. 10, the processor 110 generates the first through $L^{th}$ output feature maps 1031 through 1033 by performing the convolution operation between the first through $M^{th}$ input feature maps 1001 through 1003 and the $K_1^{th}$ through $K_N^{th}$ original kernels 1021 through 1023, respectively.

In detail, for a convolution operation between the $K_1^{th}$ original kernel 1021 and each of the first through $M^{th}$ input feature maps 1001 and 1003, the $K_1^{th}$ original kernel 1021 is decomposed into a base kernel $K_{11b}$ and a filtered kernel $K_{11f}$. Results of a base convolution operation between the base kernel $K_{11b}$ and each of the first through $M^{th}$ input feature maps 1001 through 1003 are accumulated and generated as a first base output. Then, results of a filtered convolution operation between the filtered kernel $K_{11f}$ and each of the first through $M^{th}$ input feature maps 1001 through 1003 are accumulated and generated as a first filtered output. The first output feature map 1031 is generated by combining the first base output and the first filtered output as described above.

According to an example, when there are multiple inputs (a plurality of input feature maps) and multiple outputs (a plurality of output feature maps), a base kernel decomposed from an original kernel, and on which a convolution operation is to be performed with an input feature map of an index of an odd channel, is reconstructed as weights of all elements are replaced by the same value of a first sign. On the other hand, a base kernel decomposed from an original kernel, and on which a convolution operation is to be performed with an input feature map of an index of an even channel, is reconstructed as weights of all elements are replaced by the same value of a second sign. Here, when a value of the first sign is −1, a value of the second sign is +1, and vice versa.

As shown in FIG. 10, base kernels $K_{11b}$ through $K_{N1b}$ on which a convolution operation is to be performed with the first input feature map 1001 having an index of an odd channel are all sub-kernels in which weights of elements are replaced by −1. On the other hand, base kernels $K_{12b}$ through $K_{N2b}$ on which a convolution operation is to be performed with the second input feature map 1002 having an index of an even channel are all sub-kernels in which weights of elements are replaced by +1.

As such, a base kernel corresponding to an odd channel and a base kernel corresponding to an even channel are replaced by weights of different signs such that accumulated values of accumulation are reduced. In other words, when base kernels corresponding to odd and even channels are replaced by weights of the same sign, accumulated values in base outputs may be very high, and thus a memory space for storing the base outputs may not be sufficient. However, according to another example, base kernels corresponding to odd and even channels may all be replaced by weights of the same sign when a memory space for storing base outputs is determined to be sufficient.

Then, the second output feature map 1032 according to the convolution operation between the $K_2^{th}$ original kernel 1022 and each of the first through $M^{th}$ input feature maps 1001 through 1003 may be generated by combining a second base output and a second filtered output based on kernel decomposition. In this example, the second base output is the same as the first base output because the base kernels $K_{2_{1b}}$ through $K_{2_{Mb}}$ are respectively the same as the base kernels $K_{1_{1b}}$ through $K^{1_{Mb}}$. Accordingly, a base convolution operation using each of the base kernels $K_{2_{1b}}$ through $K_{2_{Mb}}$ and accumulation for the second base output are skipped, and the first base output is reused as the second base output.

Remaining base convolution operations and accumulation are similarly skipped, and the first base output is also reused as remaining base outputs, such as an $N^{th}$ base output.

As such, the processor 110 also uses kernel decomposition with respect to the multiple inputs (a plurality of input feature maps) and multiple outputs (a plurality of output feature maps), thereby achieving an operation count reduction due to sharing of a base output, and an operation count reduction due to an empty element in a filtered kernel.

Figure 11:
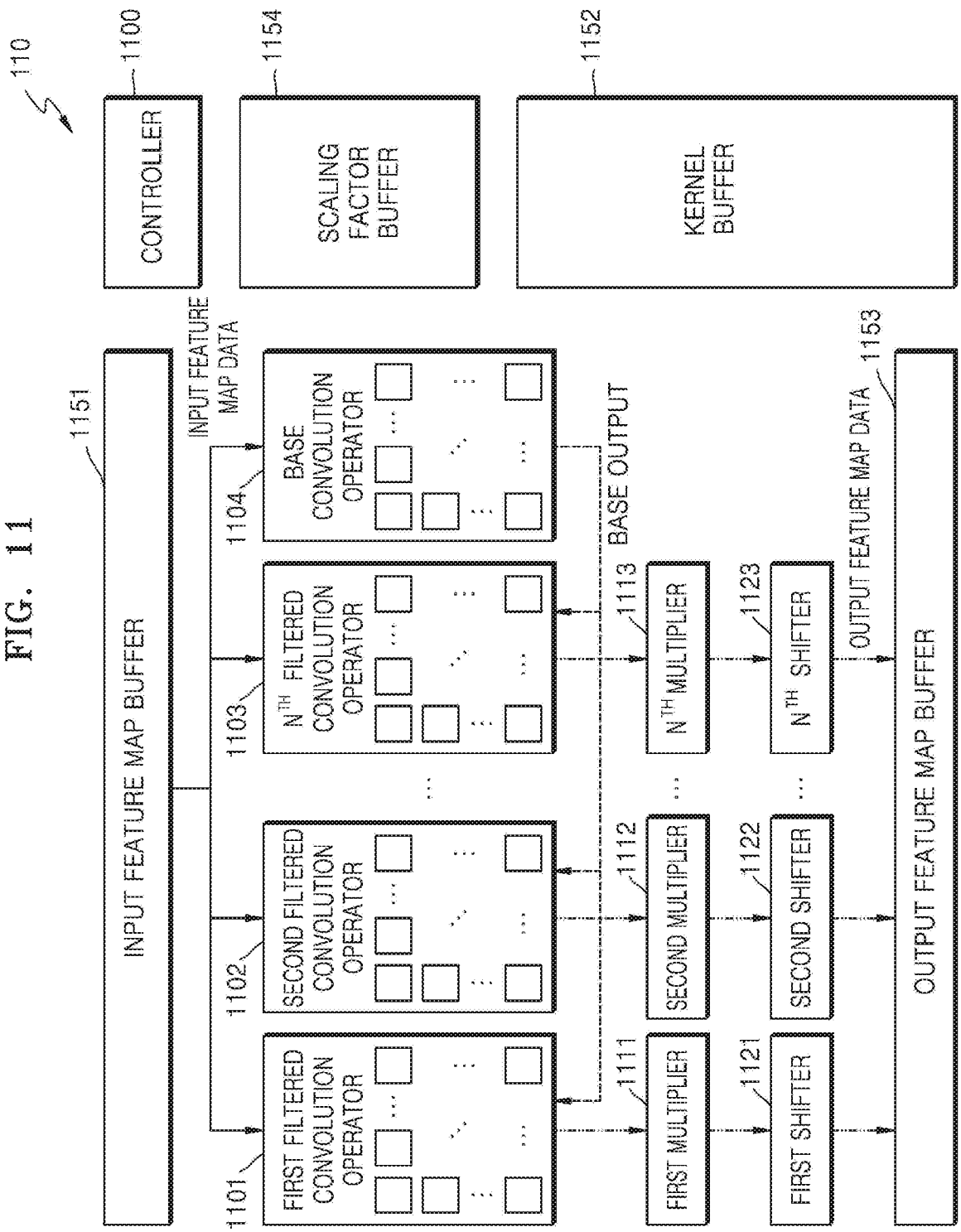
FIG. 11 is a diagram of a neural network apparatus for performing a convolution operation with a neural network based on kernel decomposition, according to an embodiment.

FIG. 11 is a diagram of a hardware design of the processor 110 for performing a convolution operation in a neural network based on kernel decomposition, according to an embodiment. Here, though FIG. 11 will be described with reference to the processor 110, such an example is for explanation purposes, and examples are not limited thereto.

Referring to FIG. 11, the processor 110 may include a controller 1100, a plurality of filtered convolution operators, i.e., first through $N^{th}$ filtered convolution operators 1101 through 1103, a base convolution operator 1104, first through $N^{th}$ multipliers 1111 through 1113, and first through $N^{th}$ shifters 1121 through 1123. The memory 120 of FIG. 3 may include an input feature map buffer 1151, a kernel buffer 1152, an output feature map buffer 1153, and a scaling factor buffer 1154.

The controller 1100 controls overall operations and functions of components shown in FIG. 11. For example, the controller 1100 may perform kernel decomposition with respect to an original kernel stored in the kernel buffer 1152, and may schedule operations of each component for a convolution operation in a neural network.

The input feature map buffer 1151 stores input feature maps of a neural network, the kernel buffer 1152 stores original kernels, and base kernels and filtered kernels decomposed from the original kernels, and the output feature map buffer 1153 stores generated output feature maps.

The base convolution operator 1104 performs a base convolution operation between an input feature map provided from the input feature map buffer 1151 and a base kernel provided from the kernel buffer 1152. The base convolution operator 1104 is operated only when an initial base convolution operation is performed. Accordingly, energy consumption is reduced via clock gating when a convolution operation is performed with respect to remaining windows.

The first through $N^{th}$ filtered convolution operators 1101 through 1103 each perform a filtered convolution operation between the input feature map, provided from the input feature map buffer 1151, and a filtered kernel, provided from the kernel buffer 1152. According to the hardware design of FIG. 11, unlike the plurality of filtered convolution operators, only one base convolution operator 1104 is illustrated because results of a base convolution operation are shared by the base convolution operator 1104.

An array of operation elements in the base convolution operator 1104 and the first through $N^{th}$ filtered convolution operators 1101 through 1103 may correspond to a size of a sub-kernel (i.e., a size of a window).

The base convolution operator 1104 and the first through $N^{th}$ filtered convolution operators 1101 through 1103 may perform parallel processes of convolution operations in the processor 110.

The first through $N^{th}$ multipliers 1111 through 1113 and the first through $N^{th}$ shifters 1121 through 1123 perform accumulation with respect to results of the base convolution operation and results of the filtered convolution operation, and an output feature map generated based on accumulation results is stored in the output feature map buffer 1153. In this example, the first through $N^{th}$ shifters 1121 through 1123 may perform a 1-bit left shift operation with respect to a filtered output so as to obtain double the filtered output described with reference to FIG. 8.

Figure 12B:
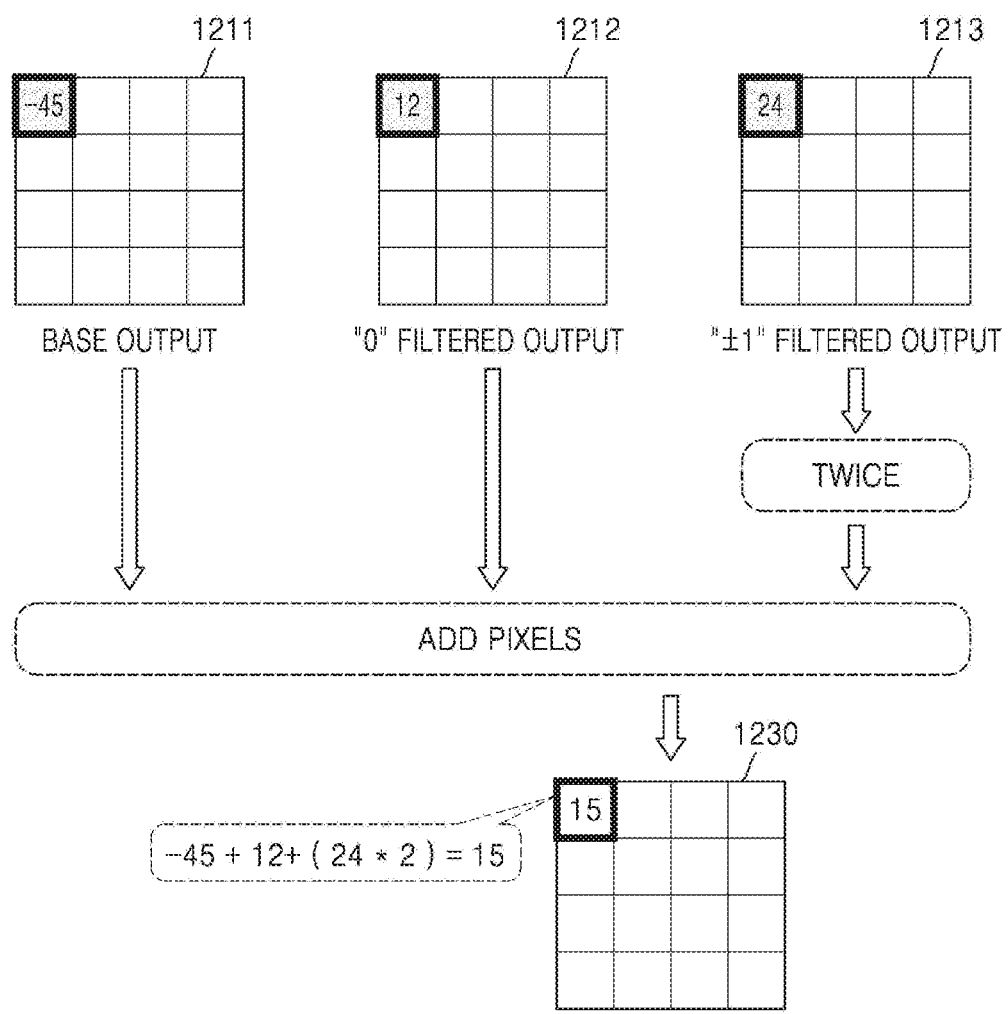

FIGS. 12A and 12B are diagrams for describing kernel decomposition of a ternary-weight kernel, according to an embodiment.

Referring to FIG. 12A, a ternary-weight original kernel 1200 has weights of −1, 0, and 1. For example, a base kernel 1201 may be a sub-kernel in which all elements are replaced by −1 (or +1). In this case, two filtered kernels are required, of which one is a "±1" filtered kernel 1202 and the other is a "0" filtered kernel 1203. The "±1" filtered kernel 1202 is a sub-kernel in which only a weight of +1 (or −1) is defined in the original kernel 1200, and the "0" filtered kernel 1203 is a sub-kernel in which only a weight of 0 is defined in the original kernel 1200.

A base convolution operation is performed by using the base kernel 1201, and a filtered convolution operation is individually performed with respect to each of the "±1" filtered kernel 1202 and the "0" filtered kernel 1203.

Referring to FIG. 12B, a pixel value of an output feature map 1230 may be determined by adding a value of a base output, a value of a "0" filtered output, and double a value of a "±1" filtered output.

One of ordinary skill in the art would understand that, when a neural network includes a ternary-weight kernel, a convolution operation may be performed via kernel decomposition and sub-kernels in a similar manner to that of a binary-weight kernel described above.

Values defined in the original kernel 1200 are only examples, and the disclosure is not limited to these examples.

Figure 13:
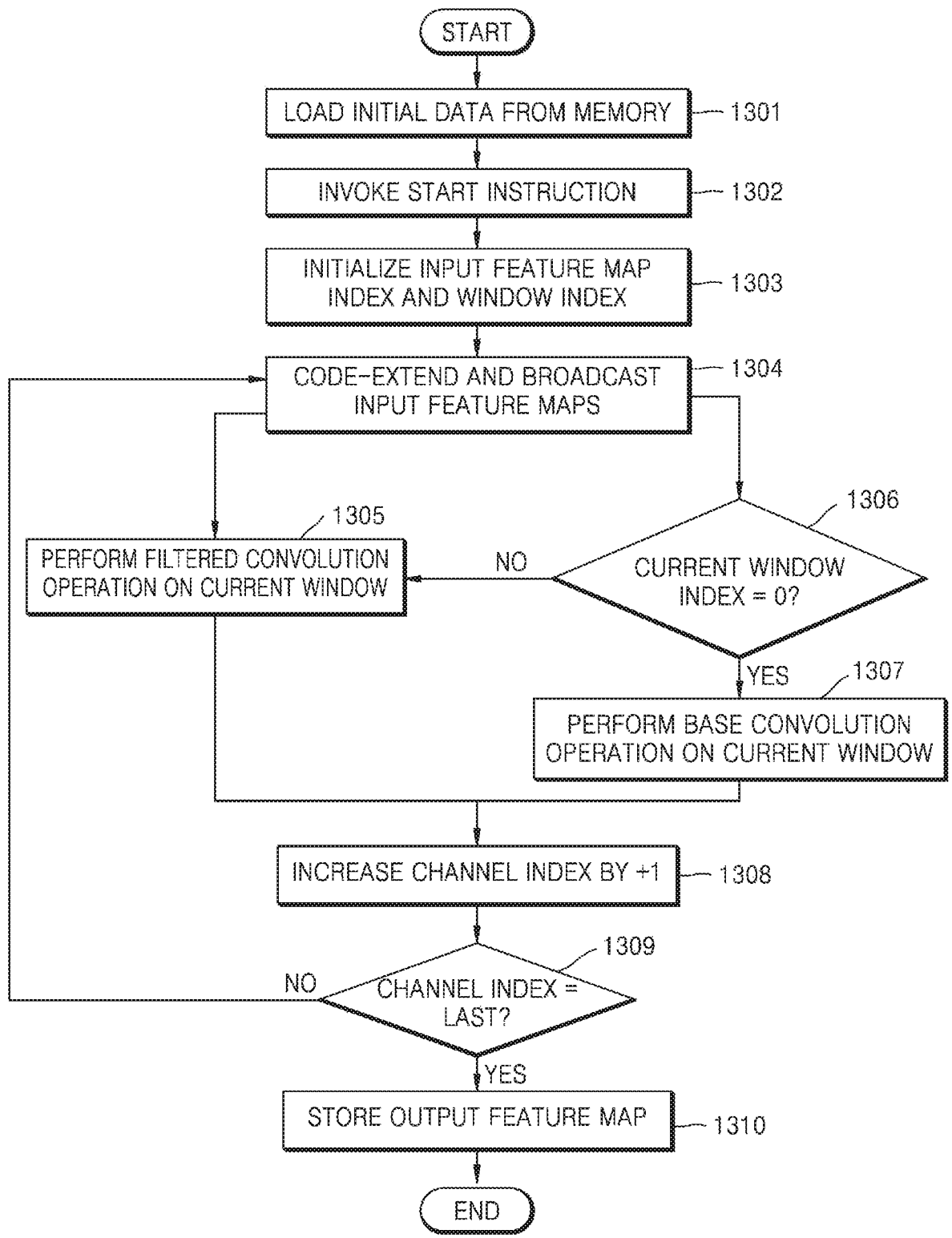
FIG. 13 is a flowchart of a method by which a neural network apparatus performs a convolution operation in a neural network by using kernel decomposition, according to an embodiment.

FIG. 13 is a flowchart of a method by which the neural network apparatus 10 performs a convolution operation in a neural network by using kernel composition, according to an embodiment. Here, though FIG. 13 will be described with reference to the processor 110, such an example is for explanation purposes, and examples are not limited thereto.

In operation 1301, the processor 110 loads initial data about an input feature map and kernel from the memory 120.

In operation 1302, when a start instruction is invoked, the processor 110 starts a convolution operation with respect to a first window of the input feature map.

In operation 1303, the processor 110 initializes an input feature map index and a window index.

In operation 1304, the processor 110 code-extends the input feature map, and then broadcasts the code-extended input feature map to the first through $N^{th}$ filtered convolution operators 1101 through 1103 and the base convolution operator 1104.

In operation 1305, the processor 110 performs a filtered convolution operation using the first through $N^{th}$ filtered convolution operators 1101 through 1103.

In operation 1306, the processor 110 determines whether a current window index is an initial index (for example, '0'). When it is determined that the current window index is the initial index, operation 1307 is performed. When it is determined that the current window index is not the initial index, operation 1305 is performed such that a base convolution operation is performed only once with respect to all kernels in one window.

In operation 1307, the processor 110 performs a base convolution operation using the base convolution operator 1104. Operations 1305 and 1307 may be performed in parallel without a sequence in time.

In operation 1308, the processor 110 increases a channel index of the input feature map by +1.

In operation 1309, the processor 110 determines whether the indexed channel index is a last channel index. When it is determined that the channel index is the last channel index, operation 1310 is performed. When it is determined that the channel index is not the last channel index, operation 1304 is performed. In other words, operations 1304 through 1308 are repeated until it is determined that the channel index is the last channel index.

In operation 1310, the processor 110 generates an output feature map by combining a base output and a filtered output, and stores the output feature map in the memory 120.

Figure 14:
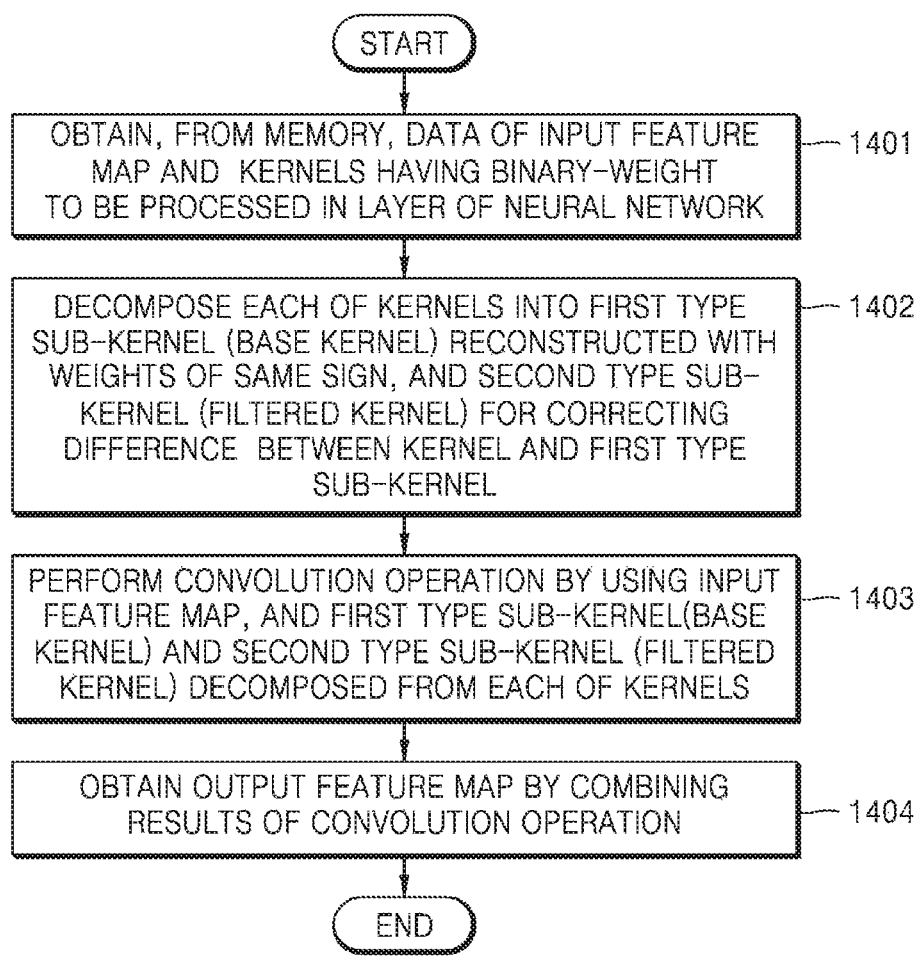
FIG. 14 is a flowchart of a method of performing a convolution operation in a neural network, according to an embodiment.

FIG. 14 is a flowchart of a method of performing a convolution operation in a neural network, according to an embodiment. The method of FIG. 14 is related to the embodiments described above, and thus the details above may also be applied to the method of FIG. 14, even when omitted.

In operation 1401, the processor 110 obtains, from the memory 120, data of an input feature map and kernels having a binary-weight, which are to be processed in a layer of a neural network.

In operation 1402, the processor 110 decomposes each of the kernels into a first type of sub-kernel (base kernel) reconstructed with weights of a same sign, and a second type of sub-kernel (filtered kernel) for correcting a difference between the kernel and the first type of sub-kernel.

The base kernel is a sub-kernel reconstructed by replacing weights of all elements in each of the kernels by the same value. When the input feature map has an index of an odd channel, the base kernel is a sub-kernel reconstructed as the weights of all elements in the base kernel are replaced by the same value of a first sign, and when the input feature map has an index of an even channel, the base kernel is a sub-kernel reconstructed as the weights of all elements in the base kernel are replaced by the same value of a second sign. Base kernels decomposed from the kernels for performing a convolution operation with the input feature map are the same.

The filtered kernel is a sub-kernel reconstructed by defining an original weight of each kernel for an element having a different weight from the base kernel and not defining a weight for remaining elements.

In operation 1403, the processor 110 performs a convolution operation by using the input feature map, and the first type sub-kernel (base kernel) and the second type sub-kernel (filtered kernel), which are decomposed from each of the kernels.

The processor 110 performs a first convolution operation (base convolution operation) between a current window of the input feature map and a base kernel decomposed from an initial kernel, and a second convolution operation (filtered convolution operation) between the current window and each of filtered kernels decomposed from the kernels. Here, the processor 110 clock-gates the base convolution operation between the current window and each of base kernels decomposed from remaining kernels excluding the initial kernel among the kernels to be skipped, and reuses a result of the base convolution operation performed with respect to the initial kernel as results of the first convolution operation with respect to the remaining kernels.

The filtered convolution operation is performed between matrix elements where a weight is defined in each of the filtered kernels and a corresponding pixel of the input feature map, and is skipped with respect to matrix elements where a weight is not defined.

In operation S1404, the processor 110 obtains an output feature map by combining results of the convolution operation. The processor 110 may determine the output feature map by determining each pixel value of the output feature map, based on a value obtained by adding double a result value of the filtered convolution operation between the filtered kernel and a window of the input feature map to a result value of the base convolution operation between the base kernel and the window, for example.

Figure 15:
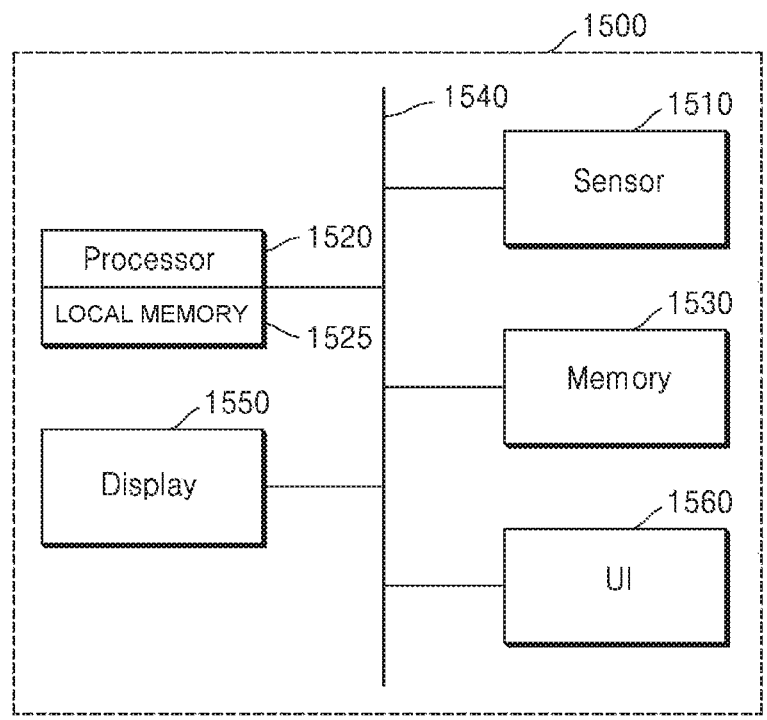
FIG. 15 is a diagram illustrating an example of an electronic system or device configured to implement a neural network.

FIG. 15 is a diagram illustrating an example of an electronic system or device 1500 configured to implement a neural network.

Referring to FIG. 15, the electronic system or device 1500 includes a sensor 1510, a processor 1520, a local memory 1525, a memory 1530, a display 1550, and a user interface (UI) 1560. The sensor 1510, the processor, 1520, the memory 1530, the display 1550, and the UI 1560 communicate with each other by a bus 1540. The electronic system or device 1500 may correspond to the neural network apparatus 10 of FIG. 3, and may implement any one or more or all of the above processes or methods. As a non-limiting example, the processor 1520 may correspond to processor 110 of FIG. 3, and/or the memory 1530 may correspond to the memory 120 of FIG. 3. The local memory 1525 may correspond to any of the above described temporary or local buffers/memories, while the memory 1530 may store a database from which kernel elements, feature maps, and/or image elements may be loaded from and into the local memory 1525. In an example, the local buffers/memories may be memories of the processor 1520 or buffers/memories directly connected to the processor 1520, e.g., configured for rapidly transferring data to/from the processor 1520 and the local memory 1525, noting that alternatives are also available. The local memory 1525 may further be allocated to temporarily store convolutional output results of a particular layer of the neural network, or all layers of the neural network, the ultimate output results of which may be stored in the memory 1530 and/or respectively used for inputs to a next layer. In an example, except for purposes of an input to a next layer, the convolutional results of each layer may discarded and only final layer(s) output results of the neural network stored to the memory 1530 or used for another process, such as in cooperation with an unlocking and corresponding display operation of a mobile phone as the electronic system or device 1500. As also noted, the processor 1520 may represent one or more processors that are configured as any one or any combination of the above neural network processing apparatuses or recognition apparatuses, as non-limiting examples.

The sensor 1510 includes or is representative of, for example, a microphone and/or an image sensor or camera to sense video data and audio data to recognize, reject, or verify an object, for example. The sensor 1510 senses an image using a well-known scheme, for example, a scheme of converting an optical image to an electronic signal. An output of the sensor 1510 is transferred to the processor 1520 or the memory 1530, and output of the sensor 1510 may also be transferred directly to, or operate as, an input layer of a neural network discussed herein.

The processor 1520 may be configured to perform one or more or all processes described with reference to FIGS. 1-14. For example, to perform a recognition, rejection, or verification operation, the processor 1520 may recognize, reject, or verify the input data based on the neural network processing operations described above with respect to FIGS. 1-14, which may also be considered acceleration processes that produce an accelerated neural network implementation that may be different from the neural network from which the kernels were trained, for example. The result of any of the recognition, rejection, or verification operations may be output through the display 1550. In addition, user adjustments or selective operations of the neural network processing operations discussed herein may be provided by UI 1560, which may include a touch screen or other input device/system. As noted above, the processor 1520 may be a graphics processor unit (GPU), reconfigurable processor, or have any other type of multi- or single-processor configuration.

In addition to instructions for operations of one or more of the neural network processing apparatuses and/or operations described in FIGS. 1-14, as noted above, the memory 1530 may store further instructions which, when executed by processor 1520, cause the processor 1520 to perform additional operations, functions, and controls of the electronic system or device 1500, such as a user interface of the electronic system. The electronic system or device 1500 may be connected to an external device, for example, a personal computer (PC) or a network, via an input/output device of the electronic system, to exchange data with the external device. The electronic system or device 1500 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a robot, a television (TV), a smart TV, or a security device for gate control.

According to the examples described above, each kernel in a neural network is separated into a base sub-kernel and a filtered sub-kernel, and convolution is performed based on the base sub-kernel and the filtered sub-kernel. The base sub-kernel includes the same weights for all matrix elements therein, and is the same for all of the kernels. The filtered sub-kernel corrects errors, and includes original weights of the respective kernel only for matrix elements of the filtered sub-kernel corresponding to matrix elements in the base sub-kernel that have weights differing from corresponding original weights of the respective kernel. Since there are empty (unweighted) matrix elements in the filtered sub-kernel, the number of operations required for convolution and the computational complexity of the neural network are substantially reduced. Accordingly, convolution may be performed more quickly and efficiently than typical approaches, and convolution may be effectively performed using hardware with less memory resources and/or processing requirements than typical approaches.

The updating processor 110 and the memory 120 in FIGS. 3 and 11, and the controller 1100, the first through $N^{th}$ filtered convolution operators 1101 through 1103, the base convolution operator 1104, the first through $N^{th}$ multipliers 1111 through 1113, the first through $N^{th}$ shifters 1121 through 1123, the feature map buffer 1151, the kernel buffer 1152, the output feature map buffer 1153, and the scaling factor buffer 1154 in FIG. 11, and the sensor 1510, the processor 1520, the local memory 1525, the memory 1530, the display 1550, and the user interface (UI) 1560 in FIG. 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, 4-10, 12A, 12B, 13, and 14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, comprising:
    obtaining, from a memory, data of an input feature map and kernels having a binary-weight, wherein the kernels are to be processed in a layer of a neural network;
    decomposing each of the kernels into a first type sub-kernel reconstructed with weights of a same sign, and a second type sub-kernel for correcting a difference between a respective kernel, among the kernels, and the first type sub-kernel;
    performing a convolution operation by using the input feature map and the first type sub-kernels and the second type sub-kernels decomposed from each of the kernels; and
    obtaining an output feature map by combining results of the convolution operation.

2. The method of claim 1, wherein the first type sub-kernel is reconstructed by replacing weights of all elements of each of the kernels with a same value.

3. The method of claim 2, wherein, when the input feature map has an index of an odd channel, the first type sub-kernel is a sub-kernel reconstructed by setting weights of all elements of the first type sub-kernel with a same value of a first sign, and when the input feature map has an index of an even channel, the first type sub-kernel is a sub-kernel reconstructed by replacing the weights of all elements of the first type sub-kernel with a same value of a second sign.

4. The method of claim 1, wherein the first type sub-kernels respectively decomposed from the kernels for performing the convolution operation with the input feature map are identical.

5. The method of claim 1, wherein the second type sub-kernel is a sub-kernel reconstructed by
    defining selected elements of the second type sub-kernel with corresponding original weights of the respective kernel that are different from corresponding weights among the weights of the first type sub-kernel,
    and not defining remaining elements of the second type sub-kernel with any weights.

6. The method of claim 1, wherein the performing of the convolution operation comprises performing a first convolution operation between a current window of the input feature map and the first type sub-kernel decomposed from an initial kernel among the kernels, and performing a second convolution operation between the current window and each of the second type sub-kernels decomposed from the kernels.

7. The method of claim 6, wherein, in the performing of the convolution operation, the first convolution operation between the current window and each of the first type sub-kernels decomposed from remaining kernels among the kernels, excluding the initial kernel, is clock-gated to be skipped, and a result of the first convolution operation performed with respect to the initial kernel is reused as results of the first convolution operation with respect to the remaining kernels.

8. The method of claim 6, wherein the second convolution operation is performed between matrix elements for which a weight is defined in each of the second type sub-kernels and a corresponding pixel of the input feature map, and is skipped with respect to matrix elements in each of the second type sub-kernels for which a weight is not defined.

9. The method of claim 1, wherein the obtaining of the output feature map comprises obtaining the output feature map by determining each pixel value among pixel values of the output feature map, based on a value obtained by adding double a result value of a second convolution operation between the second type sub-kernel and a window of the input feature map to a result value of a first convolution operation between the first type sub-kernel and the window.

10. A non-transitory computer-readable recording medium storing instructions that, when executed by a processor, cause the processor to perform the method of claim 1.

11. A neural network apparatus, comprising:
a processor configured to
obtain data of an input feature map and kernels having a binary-weight, wherein the kernels are to be processed in a layer of the neural network,
decompose each of the kernels into a first type sub-kernel reconstructed with weights of a same sign, and a second type sub-kernel for correcting a difference between a respective kernel, among the kernels, and the first type sub-kernel,
perform a convolution operation by using the input feature map and the first type sub-kernels and the second type sub-kernels decomposed from each of the kernels, and
obtain an output feature map by combining results of the convolution operation.

12. The neural network apparatus of claim 11, wherein the first type sub-kernel is reconstructed by replacing weights of all elements of each of the kernels with a same value.

13. The neural network apparatus of claim 12, wherein, when the input feature map has an index of an odd channel, the first type sub-kernel is a sub-kernel reconstructed by replacing weights of all elements of the first type sub-kernel with a same value of a first sign, and when the input feature map has an index of an even channel, the first type sub-kernel is a sub-kernel reconstructed by replacing the weights of all elements of the first type sub-kernel with a same value of a second sign.

14. The neural network apparatus of claim 11, wherein the first type sub-kernels respectively decomposed from the kernels for performing the convolution operation with the input feature map are identical.

15. The neural network apparatus of claim 11, wherein the second type sub-kernel is a sub-kernel reconstructed by defining selected elements of the second type sub-kernel with corresponding original weights of the respective kernel that are different from corresponding weights among the weights of the first type sub-kernel, and not defining remaining elements of the second type sub-kernel with any weights.

16. The neural network apparatus of claim 11, wherein, for the performing of the convolution, the processor is configured to execute the at least one program to perform a first convolution operation between a current window of the input feature map and the first type sub-kernel decomposed from an initial kernel among the kernels, and perform a second convolution operation between the current window and each of the second type sub-kernels decomposed from the kernels.

17. The neural network apparatus of claim 16, wherein the processor is further configured to clock-gate a first convolution operation between the current window and each of the first type sub-kernels decomposed from remaining kernels among the kernels, excluding the initial kernel, to be skipped, and reuse a result of the first convolution operation performed with respect to the initial kernel as results of the first convolution operation with respect to the remaining kernels.

18. The neural network apparatus of claim 16, wherein the second convolution operation is performed between matrix elements for which a weight is defined in each of the second type sub-kernels and a corresponding pixel of the input feature map, and is skipped with respect to matrix elements in each of the second type sub-kernels for which a weight is not defined.

19. The neural network apparatus of claim 11, wherein the processor is further configured to obtain the output feature map by determining each pixel value among pixel values of the output feature map, based on a value obtained by adding double a result value of a second convolution operation between the second type sub-kernel and a window of the input feature map to a result value of a first convolution operation between the first type sub-kernel and the window.

20. The neural network apparatus of claim 11, further comprising a memory storing instructions that, when executed, configure the processor to obtain the data and the kernels, decompose each of the kernels, perform the convolution operation, and obtain the output feature map.

* * * * *